United States Patent
Franceschini et al.

(10) Patent No.: US 9,784,371 B2
(45) Date of Patent: *Oct. 10, 2017

(54) BRUSH SEAL

(71) Applicant: ROLLS-ROYCE PLC, London (GB)

(72) Inventors: Gervas Franceschini, Derby (GB); Terence Valentine Jones, Oxford (GB); Felix Lepetit, London (GB)

(73) Assignee: ROLLS-ROYCE plc, London (GB)

( * ) Notice: Subject to any disclaimer, the term of this patent is extended or adjusted under 35 U.S.C. 154(b) by 359 days.

This patent is subject to a terminal disclaimer.

(21) Appl. No.: 14/318,099

(22) Filed: Jun. 27, 2014

(65) Prior Publication Data
US 2015/0001809 A1    Jan. 1, 2015

(30) Foreign Application Priority Data
Jun. 28, 2013 (GB) .................................. 1311611.6

(51) Int. Cl.
*F16J 15/32* (2016.01)
*F16J 15/3288* (2016.01)
*F16J 15/3244* (2016.01)

(52) U.S. Cl.
CPC ....... *F16J 15/3288* (2013.01); *F16J 15/3244* (2013.01); *Y10T 29/49826* (2015.01)

(58) Field of Classification Search
CPC ............................ F16J 15/3288; F16J 15/3292
See application file for complete search history.

(56) References Cited

U.S. PATENT DOCUMENTS

| | | | |
|---|---|---|---|
| 5,183,197 A | 2/1993 | Howe | |
| 5,201,530 A | 4/1993 | Kelch et al. | |
| 5,335,920 A * | 8/1994 | Tseng | F16J 15/3288 277/303 |
| 5,474,305 A * | 12/1995 | Flower | F16J 15/3288 277/355 |
| 5,480,165 A | 1/1996 | Flower | |
| 6,120,622 A | 9/2000 | Mayr et al. | |

(Continued)

FOREIGN PATENT DOCUMENTS

| | | |
|---|---|---|
| GB | 2 355 049 A | 4/2001 |
| JP | A-2011-94803 | 5/2011 |
| WO | WO 2013/153868 A1 | 10/2013 |

OTHER PUBLICATIONS

Franceschini et al., "Improved Understanding of Blow-Down in Filament Seals," *Journal of Turbomachinery*, Oct. 2010, vol. 132, pp. 041004-1 to 041004-10.

(Continued)

*Primary Examiner* — Vishal A Patel
(74) *Attorney, Agent, or Firm* — Oliff PLC (57) ABSTRACT

Described is a brush seal for sealing between a first component and a second component which relatively rotate during normal use, comprising: an annular housing which is attached to a first component in use; a plurality of bristles each having a fixed end attached to the housing and a free end, wherein the free ends of at least some of the plurality of bristles contact the second component during normal use to provide a sealing surface, wherein the sealing surface includes a plurality of discontinuities around the circumference of the brush seal for providing hydrodynamic lifting force in use.

9 Claims, 5 Drawing Sheets

(56) References Cited

U.S. PATENT DOCUMENTS

| | | | |
|---|---|---|---|
| 6,267,381 B1* | 7/2001 | Wright | F16J 15/3292 277/355 |
| 6,343,792 B1* | 2/2002 | Shinohara | F01D 11/001 277/345 |
| 6,808,179 B1* | 10/2004 | Bhattacharyya | F01D 11/00 277/348 |
| 7,487,588 B2 | 2/2009 | Hogg et al. | |
| 7,828,297 B2 | 11/2010 | Hoebel et al. | |
| 8,025,296 B2 | 9/2011 | Uehara et al. | |
| 8,231,340 B2 | 7/2012 | Howes | |
| 8,393,859 B1 | 3/2013 | Dillon | |
| 8,585,058 B2 | 11/2013 | Rhodes et al. | |
| 8,608,174 B2 | 12/2013 | Kono | |
| 2002/0000694 A1 | 1/2002 | Justak | |
| 2002/0105146 A1 | 8/2002 | Uehara et al. | |
| 2003/0062685 A1* | 4/2003 | Inoue | F16J 15/3288 277/355 |
| 2003/0151206 A1* | 8/2003 | Smith | A46B 3/02 277/355 |
| 2004/0173969 A1* | 9/2004 | Smith | A46B 3/02 277/355 |
| 2005/0053758 A1* | 3/2005 | Smith | A46B 3/02 428/90 |
| 2007/0018408 A1* | 1/2007 | Kono | F16J 15/3292 277/355 |
| 2007/0120326 A1 | 5/2007 | Rhodes et al. | |
| 2009/0081028 A1 | 3/2009 | Morgan et al. | |
| 2009/0322038 A1* | 12/2009 | Wright | F01D 11/00 277/551 |
| 2011/0135453 A1 | 6/2011 | Howes | |
| 2011/0227289 A1* | 9/2011 | Stefan | F16J 15/3288 277/355 |
| 2012/0093633 A1 | 4/2012 | Kasibhotla et al. | |
| 2013/0042456 A1* | 2/2013 | Anand | F16J 15/3288 29/428 |
| 2013/0119613 A1 | 5/2013 | Jahn | |
| 2013/0313782 A1* | 11/2013 | Jahn | F16J 15/3288 277/309 |
| 2015/0001809 A1* | 1/2015 | Franceschini | F16J 15/3288 277/355 |
| 2015/0014939 A1* | 1/2015 | Inoue | F02C 7/28 277/355 |
| 2015/0323077 A1* | 11/2015 | Franceschini | F16J 15/3292 277/355 |

OTHER PUBLICATIONS

Nov. 4, 2016 Office Action issued in U.S. Appl. No. 14/317,651.

* cited by examiner

BRUSH SEAL

TECHNICAL FIELD OF INVENTION

This invention relates to a brush seal. In particular, this invention relates to a brush seal for a gas turbine engine.

BACKGROUND OF INVENTION

Figure 1:
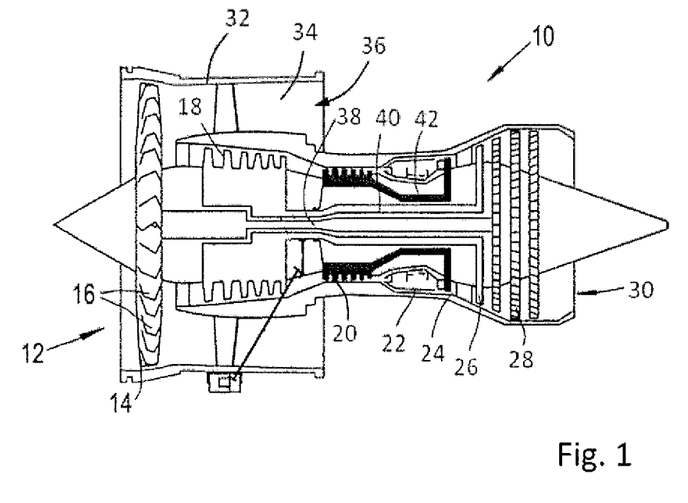
FIG. 1 shows a conventional gas turbine engine.

FIG. 1 shows a ducted fan gas turbine engine 10 comprising, in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle 32 generally surrounds the engine 10 and defines the intake 12, a bypass duct 34 and a bypass exhaust nozzle 36.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by interconnecting shafts 38, 40, 42.

Figure 2:
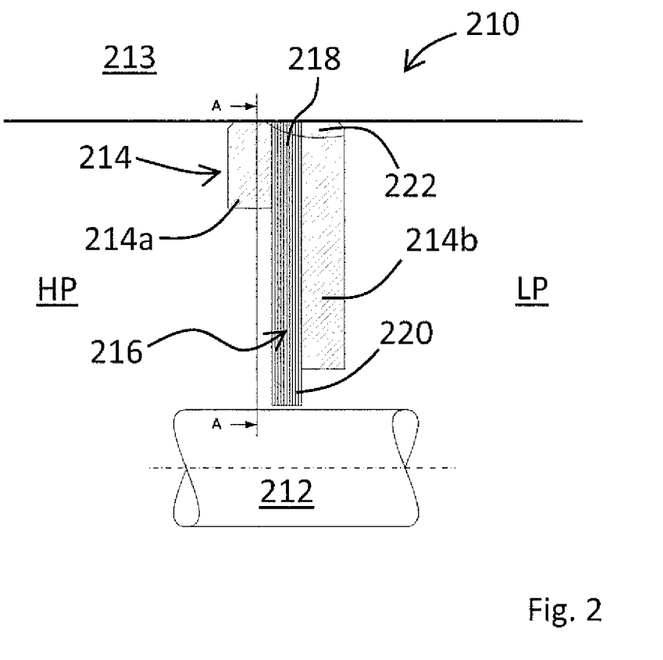
FIG. 2 shows a cross-section of a typical brush seal as known in the art.

Brush seals are well known in the art and are used within a gas turbine engine to provide a seal around a rotating component which extends between two areas which are held at different pressures. FIG. 2 shows a cross-section of a typical brush seal 210 which is placed around a rotating shaft 212 within a bearing housing for example. The left hand side of FIG. 2 represents a high pressure, HP, or upstream area, with the right hand side being a lower pressure, LP, or downstream area. It will be apparent that, for the case of a gas turbine engine, the shaft 212 is not to scale and a corresponding portion of the annular brush is omitted on the opposing underside of the shaft 212 for the sake of clarity.

The brush seal 210 includes an annular housing 214 which holds a plurality of radially extending wire bristles 216 at a fixed end 218. The annular housing 214 comprises an upstream or front plate 214a and a downstream or backing plate 214b which are fixed to a first component 213 such that the bristles 216 extend radially inwards towards a rotating component 212 at their free ends 220. The free ends 220 of the bristles 216 contact the rotating component 212 in use and are of sufficient density that they impede the air flow from the upstream side to the downstream side of the seal 210 so as to provide a seal. It will be appreciated that there will be a certain amount of air which leaks through, the amount of which will be dependent on a number of variables and is therefore application specific.

Figure 3A:
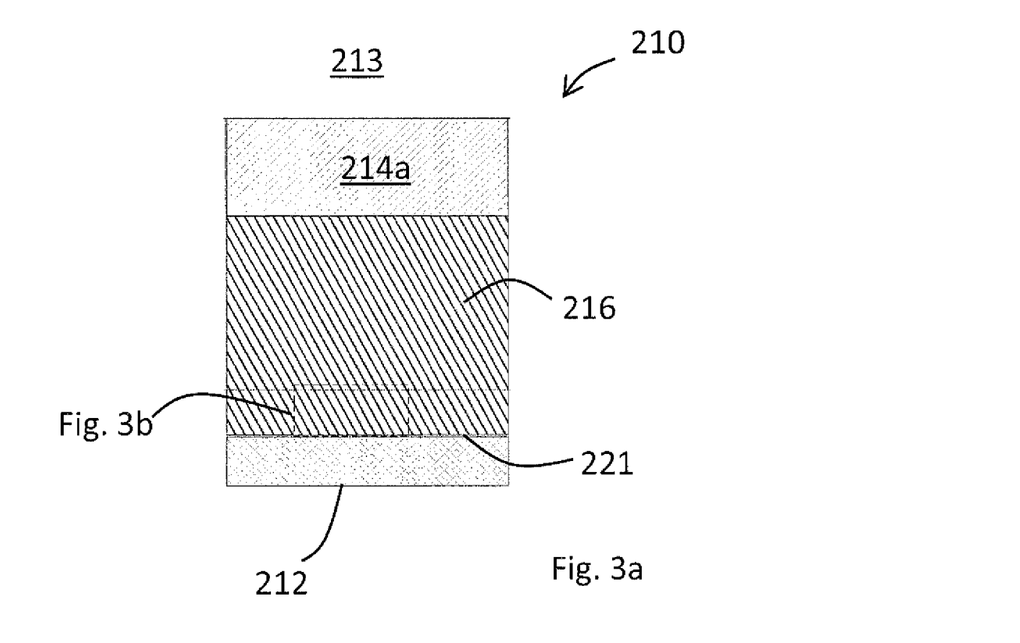
FIGS. 3a and 3b show the A-A axial end view of a portion of the brush seal shown in FIG. 2.
Figure 3B:
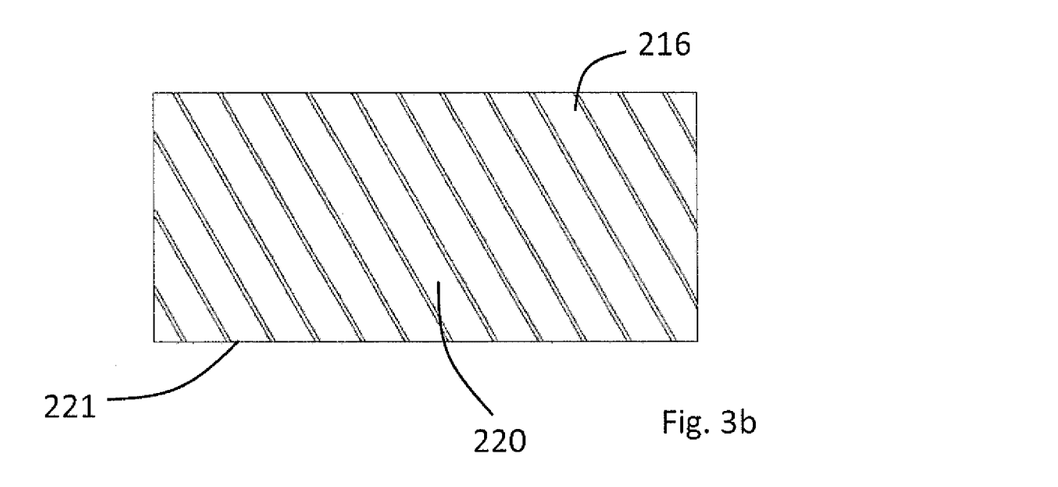

FIGS. 3a and 3b show an axial end view of a portion of the brush seal 210 from the HP side as defined by section A-A shown in FIG. 2. As can be seen, the bristles 216 are circumferentially inclined with respect to the surface of the rotating shaft 212 such that they contact the shaft 212 at an angle. The bristles 216 are inclined in the direction of rotation of the shaft 212 such that the free ends of the bristles wipe the rotor 212 during use at a sealing surface 221. The sealing surface profile of the free end faces is typically provided by a suitable machining process such as grinding or cutting process.

The brush seal 210 can be made in a number of ways. The seal 210 shown in FIG. 2 is constructed by arranging the bristles 216 between the axially separated front 214a and backing 214b plates at a required density before welding 222 them in place at the fixed ends 218. The collection of bristles can be referred to as a bristle pack.

The present invention provides an improved brush seal.

STATEMENTS OF INVENTION

In a first aspect, the present invention provides a brush seal for sealing between a first component and a second component which relatively rotate during normal use, comprising: an annular housing which is attached to a first component in use; a plurality of bristles each having a fixed end attached to the housing and a free end, wherein the free ends of at least some of the plurality of bristles contact the second component during normal use to provide a sealing surface, wherein the sealing surface includes a plurality of discontinuities around the circumference of the brush seal for providing hydrodynamic lift force in use. The plurality of bristles include a first group which contact the second component in use, and a second group which are arranged to provide the discontinuity, wherein the bristles of the first and second groups may be uniformly interspersed around an arcuate portion of the brush seal.

Providing a brush seal with discontinuities in the sealing surface allows a hydrodynamic lifting force to be created on some of the bristles during use. This can reduce the amount of wear on the brush seal and the second component. It will be appreciated that the hydrodynamic lifting force may result in the bristles being lifted off the second component or may simply represent a reduction in the contact force so as to reduce the associated wear.

The plurality of bristles may be different lengths such that the free ends of the first group of bristles contact the second component in use, and the free ends of the second group do not contact the second component in use. The second group may be located at either or both the upstream side or downstream side of the brush seal.

The bristles each have a longitudinal axis. The end face of the free ends of the bristles may be at an angle relative to the longitudinal axis. The angles of the first group and second group may be at a common angle. Alternatively, at least some of the free end face angles of the second group of bristles may be different to the free end face angles of the first group of bristles.

The bristles of the second group can have a range of lengths.

The free end face angles of the second group may include a plurality of free end face angles.

The bristles may have different diameters.

The second group of bristles may be shorter than the first group bristles by between 0.1 mm and 2 mm. Preferably, the difference in length is at least 0.5 mm. These differences may be working differences after a period of wear has been taken into account. In some embodiments, the second group may include a distribution having 10% of bristles with 0.5 mm minimum separation, 5% of bristles with 1 mm minimum separation and 5% of bristles with 1.5 mm minimum separation. The different lengths of bristle may be mixed throughout the bristle pack.

The second group may include between 2.5% to 50% of the available bristles. Preferably, the second group may include between 5% and 15% of the available bristles.

The minimum recessed distance of the free end of the second group from the second component is greater than half the bristle diameter. Preferably, the recessed distance or separation is greater than the bristle diameter.

Some of the second group of bristles may contact the shaft. In this case, the discontinuities may be provided by angled end faces which provide a separation from the second component across a portion of the end face.

In a second aspect, the present invention provides a method of manufacturing a brush seal comprising: providing a first group of bristles having a first length; providing a second group of bristles having a second length; arranging the first and second groups of bristles to provide a mixed bundle having a predetermined distribution of first and second grouped bristles; and, attaching the fixed bundle to a housing.

The distribution of the first and second groups within the mixed bundle may be random.

DESCRIPTION OF DRAWINGS

Embodiments of the invention will now be described with the aid of the following drawings of which.

DETAILED DESCRIPTION OF INVENTION

Bristle blow-down, whereby the bristles experience a radial force which pushes them into contact with the shaft, is proportional to the differential fluid pressure across the whole bristle pack as discussed in Franceschini, G., Jones, T. V., and Gillespie, D. R. H., Improved Understanding of Blow-Down in Filament Seals, Journal of Turbomachinery 132 (2010) 041004, TURBO-09-1028 which is incorporated by reference. In a gas turbine, during operation of the engine, pressures generally increase with shaft speeds and temperatures. Thus the blow-down effect is generally higher when the engine is operating at high speed and temperature. Although a limited amount of blow-down can assist with the sealing, too much blow-down can be detrimental to the life of the seal and the shaft around which it seals. If a hydrodynamic lifting force can be encouraged, the force will increase with high shaft speeds and will act to offset the blow-down effect and thus the bristle tip contact loading. Hence, providing a brush seal with hydrodynamic lifting force is particularly advantageous.

Known brush seals such as the one shown in FIGS. 2, 3a and 3b are machined to have a cylindrical inner sealing surface. Hence, the free end surfaces of the bristles are effectively parallel to the corresponding surface of the rotor and more or less uniform around the circumference. This arrangement generally provides a good sealing fit, but creates an inner bore with limited potential for generating hydrodynamic lift force during use making it subject to undesirable levels of bristle and shaft wear and a resultant general deterioration in the seal's efficiency and reduced service life.

Figure 4A:
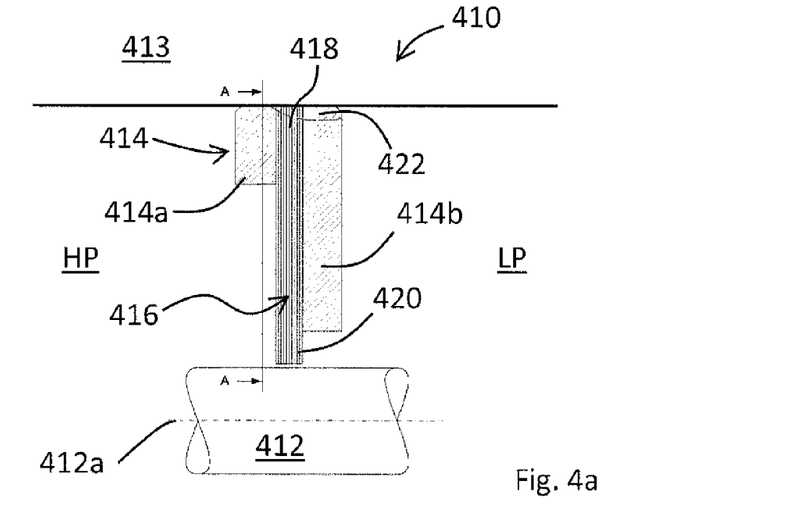
FIGS. 4a and 4b show a brush seal according to the invention.
Figure 4B:
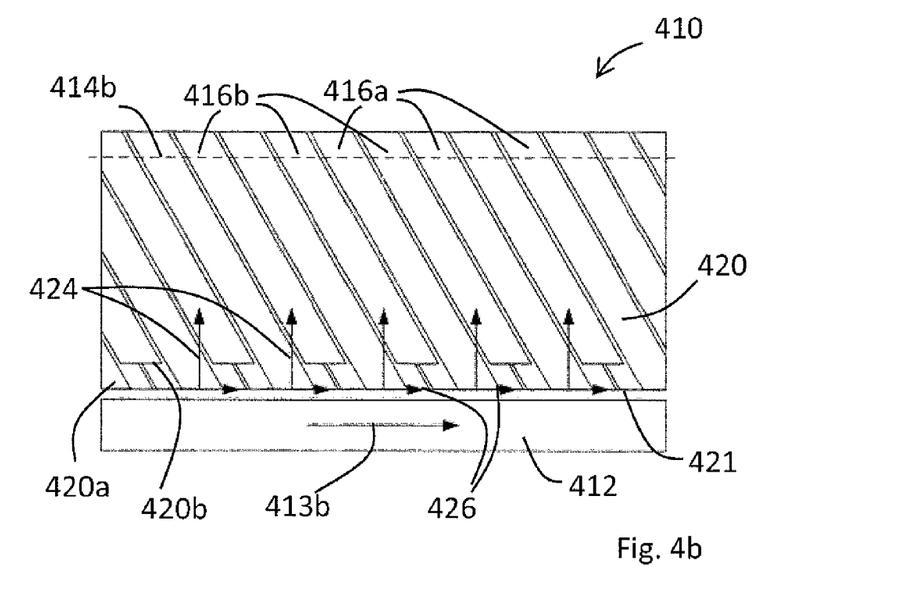

FIGS. 4a and 4b show a brush seal according to the present invention with FIG. 4a depicting a cross-sectional view in a plane which includes the rotational axis 412a of the shaft 412 and FIG. 4b showing an axial end view of a portion of a brush seal 410 as defined by the plane A-A in FIG. 4a.

The brush seal 410 is for sealing between a first component 413 and a second component 412 which are arranged and operated so as to relatively rotate during normal use. For the purpose of the described embodiment, the first component 413 can be taken to be a stationary part of a gas turbine engine, such as a bearing housing, with the second part being a rotatable shaft 412 having an axis of rotation 412a. The rotational direction of the shaft 412 is from left shown by arrow 413b in FIG. 4b. The rotatable shaft 412 passes from a high pressure area, HP, to a low pressure, LP, area.

Locations where brush seals may be used include but are not limited to dynamic seal applications such as in a bearing chamber so as to provide a seal which reduces the air flow into the bearing chamber and prevent oil escape, and so-called buffer seals which reduce the loss of high pressure air away from a buffer zone, for example for providing a high pressure pocket around a bearing chambers or the like to ensure that oil is contained within the bearing.

The brush seal 410 includes an annular housing 414 comprising a front plate 414a and a backing plate 414b which are attached to the stationary part 413 in use. It will be appreciated that the term housing is taken to have a broad meaning and refers to any arrangement which can be used to attach the bristles to the second component. For example, in some embodiments, the housing may include a retaining ring to which the front plates and back plates are attached. I In other embodiments it may be a crimped section of material which clamps the bristles and provides integral front and back plates.

The annular housing 414 has a plurality of bristles 416 extending from a fixed end 418 radially inwards towards a free end 420. The bristles 416 are circumferentially inclined with respect to the surface of the rotating shaft 412 such that some contact the shaft 412 at an angle. The inclination of the bristles 416 is generally in the direction of the rotation of the shaft 412.

The bristles 416 can be subdivided into two groups. The first group 416a contact the shaft 412 at the free ends thereof. The second group 416b are arranged to provide hydrodynamic lift to the bristles of the first group 416a and to a lesser extent the second group 416b. Each of the bristles 416 has a fixed end 418 which is attached to the housing 414 and a free end 420 which is either in contact with or separated from the surface of the shaft 412 under normal operating conditions. That is, the plurality of bristles 416 includes bristles of different lengths such that the free ends 420a of a first group 416a of bristles contact the rotating shaft 412 and the free ends 420b of a second group 416b do not contact the shaft 412. This provides a discontinuity in the bristle 416 distribution around the circumference of the sealing surface 421. In the described embodiment, the discontinuity is provided by a total separation of the free ends 420b and shaft 412. However, as will be noted from FIG. 6 below, the discontinuity may be provided by free ends which are only partially separated from the shaft and thus in partial contact.

The space between the free ends 420b of the second group 416b of bristles and the shaft 412 allows significant gas diffusion into the bristle pack and the generation of hydrodynamic lifting forces 424 under the bristles 416a of the first group as well as there being drag 426 present at the bristle free ends 420. Providing the bristles 416 in this fashion is akin to providing a plurality of discontinuities in the form of Rayleigh steps around the circumference of the bristle pack.

The hydrodynamic lift is particularly profound in the described arrangement because the bristles 416 are generally inclined to the radial direction and pointing in the direction of rotational path of travel of the shaft 412. Thus, there is provided a geometry which is a converging wedge followed by a flat surface which allows an isolated bristle to generate a significant amount of hydrodynamic lifting force. The angle of inclination may be in the range bounded by the values 15 degrees and 75 degrees but generally is between 30 degrees and 60 degrees. Typically, the angle of incidence is around 45 degrees.

Figure 6:
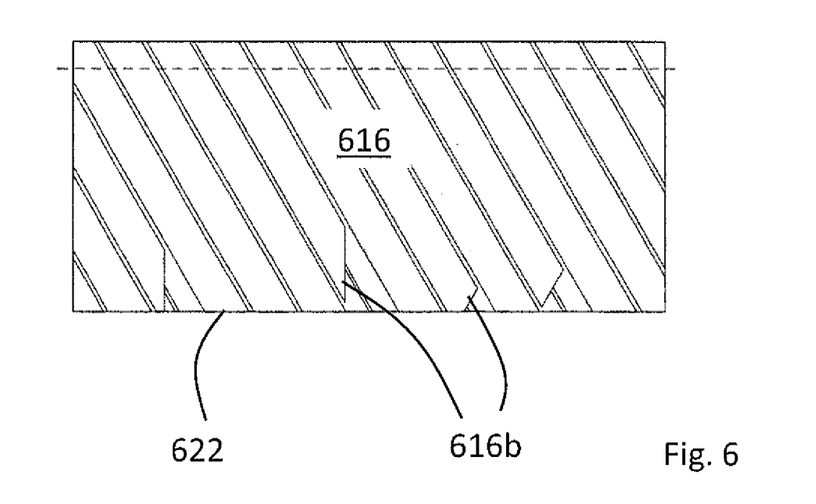
FIG. 6 shows yet another alternative brush seal according to the invention.

It will be appreciated that after a period of use and under some operating conditions, some of the second group of bristles 416 may contact the shaft 412 in use due to wear and extreme operating conditions. Or, as shown in FIG. 6, some portion of some of the free ends 420 of the second group 416b of bristles 416 partially contact the shaft 416 to provide the required separation. It will also be appreciated that the hydrodynamic lift generated by the discontinuities may cause the bristles of the first group to lift under some operating conditions. This will reduce the contacting force between the bristles and the shaft and in some cases lead to a complete separation in use. Hence, it may be that the bristles only physically contact the shaft under some modes of operation or operating conditions (and may be in very close proximity to the shaft at other modes of operation or operating conditions).

The discontinuities can be evenly distributed around an arcuate portion of the circumference of the sealing surface 422 such that the bristles 416 are interspersed in a uniform way. This may be achieved in groups of longer bristles 416 interspersed with one or more shorter bristles 416, or with bristles 416 of alternating length in which adjacent bristles are of different lengths, as shown in FIG. 4b.

Figure 5:
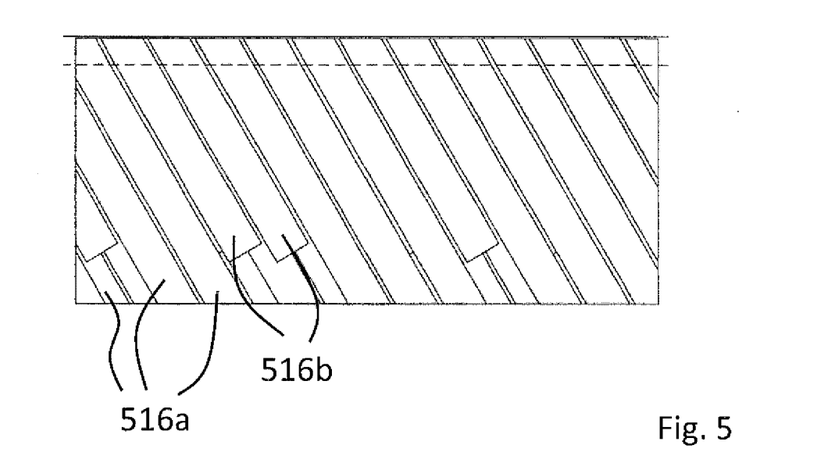
FIG. 5 shows an alternative brush seal according to the invention.

In another advantageous embodiment, the bristles 416 can be randomly interspersed around an arcuate portion of the circumference such that there are small groups of varying numbers of long bristles 516a interspersed with small groups or individual short bristles 516b as shown in FIG. 5.

The bristles 416b, 516b of the second group may be of similar or different lengths so as to define sub-groups. In the case where the bristles of the second group 416b, 516b are different lengths, the different lengths may be distributed around the circumference in uniform pattern or randomly distributed.

In another embodiment, as shown in FIG. 6, the ends of the bristles 616b of the second group are cut at different angles. In this instance, a small portion of the free end face of some of the bristles 616b contact the shaft in use with discontinuities around the sealing surface 622 within the bristle pack 616 being provided by the angled cuts of the free ends.

It will be appreciated that the first and second groups of bristles will be distributed around the circumference of the sealing surface and the throughout the axial width of the seal. It will also be appreciated that it may be advantageous in some applications to include a larger number of discontinuities in the axially downstream portions of the seal to account for the higher blow-down forces which can be experienced in the downstream region with some brush seal designs.

As well as altering the length or end profile of the bristles, in some embodiments the diameters of the bristles within the each of the first and second groups may be different to tailor the hydrodynamic lifting force and or provide a greater stiffness. For example, in some embodiments it will be advantageous to ensure that the second group of bristles are of a larger diameter and thus provide more area for gas diffusion to help control the amount of hydrodynamic lift experienced by the first group. These larger diameter bristles will provide additional stiffening to the bristle pack. If this additional stiffening is not desirable then this can be offset by the use of a material with slightly lower elastic modulus at the normal operating conditions. This is particularly so where the shorter bristles are designed not to contact the shaft and need not be selected for wear resistance like the longer bristles.

The brush seals can be constructed from conventional materials as known in the art.

Figure 7A:
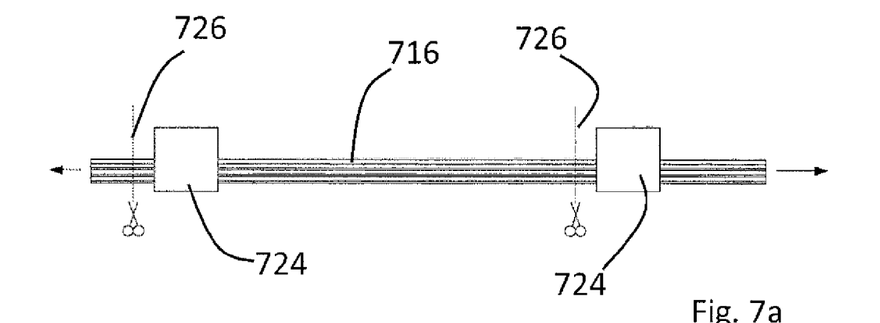
FIGS. 7a-c show a method of manufacturing a brush seal of the invention.
Figure 7B:
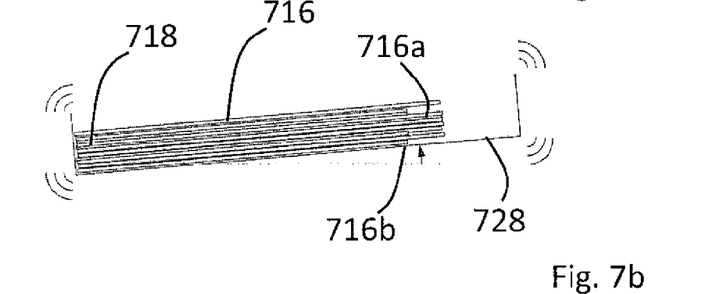
Figure 7C:
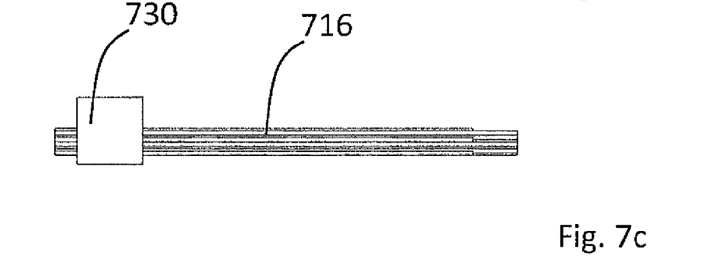

FIGS. 7a-7c show an advantageous method for constructing a bristle pack of the invention.

In FIG. 7a there is shown a first step in which a bundle of bristles 716 is formed by collecting a number of wires and attaching them to temporary fixings 724 (one for each resulting bundle) distributed along the length of the bundle of wires 716 at set intervals which correspond to a length of required bristle. The bundle 716 is then cut 726 local to each temporary fixing 724 to provide individual bundles of equal length. Shorter length bundles for the second group can be formed in a similar fashion.

The temporary fixings 724 are removed one by one and the short and long bundles intermixed in a random fashion and loaded into a hopper 728 which is vibrated to align a first end 718 (what will be the fixed end) of the bristles as shown in FIG. 7b. The duration and level of vibration is sufficient to provide the required interspersion of the short 716a and long 716b bristles. Once aligned, the bristles 716 are gathered and a new temporary fixing 730 applied to fix the ends of the bristles relative to each other, as shown in FIG. 7c. This provides a bristle pack 716 with varying displacement of free ends throughout. The mixed length bundles can be used in the conventional manner to provide a finished brush seal. In some embodiments, this will involve using the temporary fixing to set the bristles at the correct lay angle before adding the front and backing plates and welding the assembly together at the outer diameter.

Once the pack is assembled, the inner bore is machined to provide the longer or first group 716a of bristles with a desired free end angle for the sealing surface. The shorter bristles having reduced length and so are not altered by the final machining. It will be appreciated that the bristles shown in FIG. 6 with the angled end faces may be produced by appropriately cutting individual wires before assembling the bundle.

In one embodiment, the bristle bundle lengths are 25 mm (including length needed for attachment to the assembly fixture) and approximately 2 mm is ground off the inner bore for a brush seal which has a maximum wear of 0.5 mm and 0.5 mm recess from the tip is to be maintained, then the shortened bristles should be 25 mm-2 mm-0.5 mm-0.5 mm=22 mm. This ensures that the air-riding geometry in the bristle pack is present at seal delivery (where there would be a 1 mm length difference at the tip at seal delivery) and maintained throughout the service life (where the minimum length difference can reduce to 0.5 mm towards the end). It will be appreciated that other bristle lengths and clearances will be possible within the scope of the invention.

The enhanced air-riding bristle pack can be created with typically 2.5% to 50% of bristles being of the shorter type. Preferably the shorter type accounts for 5% to 15% of bristles to avoid any noticeable leakage increase from a more porous bristle tip region. In other embodiments, a typical distribution would include 10% of bristles with 0.5 mm minimum separation, 5% of bristles with 1 mm minimum separation and 5% of bristles with 1.5 mm minimum separation and these would be mixed through the bristle pack. The minimum recessed distance from the bristle tip should be greater than half the bristle diameter and preferably greater than the bristle diameter.

The same principle of collecting different length wires together can be applied to alternative manufacturing approaches. For example, where the brush bundle is wrapped around a wire and crimped or clamped then shortened bristles can be added in a similar way. The bundles can also be arranged alternately to provide differential lengths on the upstream and downstream sides of the bristle pack, thereby providing a means for controlling the distribution of shortened bristles on either the upstream or downstream sides.

The above described embodiments are examples only and should not be taken to restrict the scope of the appended claims. Further, where applicable, features of one embodiment may be used in another embodiment.

The invention claimed is:

1. A brush seal for sealing between a first component and a second component which relatively rotate during normal use, comprising:
an annular housing which is attached to a first component in use;
a plurality of bristles arranged in multiple circumferential rows between an upstream side and a downstream side, each of the multiple circumferential rows extending around a circumference of the brush seal, each bristle of the plurality of bristles having a fixed end attached to the housing and a free end, wherein the free ends of at least some of the plurality of bristles contact the second component during normal use to provide a sealing surface,
wherein the sealing surface includes a plurality of discontinuities along at least one row of the multiple circumferential rows around the circumference of the brush seal for providing hydrodynamic lifting force in use,
wherein the at least one row of the plurality of bristles includes a first group which contact the second component in use, and a second group which are arranged to provide the discontinuity wherein the bristles of the first and second groups are randomly interspersed along the at least one row around an arcuate portion of the brush seal,
wherein the at least one row of the plurality of bristles is provided at either or both a most upstream side and a most downstream side of the plurality of bristles, and
wherein the bristles each have a longitudinal axis, an end face of the free ends of the bristles are at an angle relative to the longitudinal axis, the angles of the first group are at a common angle and at least some of the free end face angles of the second group of bristles are different to the free end face angles of the first group of bristles.

2. A brush seal as claimed in claim 1, wherein the plurality of bristles are different lengths such that the free ends of the first group of bristles contact the second component in use, and the free ends of the second group do not contact the second component in use.

3. A brush seal as claimed in claim 1, wherein the free end face angles of the second group include a plurality of free end face angles.

4. A brush seal as claimed in claim 1 wherein the bristles of either or both of the first or second groups have different diameters.

5. A brush seal as claimed in claim 2, wherein the second group of bristles is shorter than the first group bristles by between 0.1 mm and 2 mm.

6. A brush seal as claimed in claim 2, wherein the second group includes between 2.5% to 50% of the available bristles.

7. A brush seal as claimed in claim 2 wherein a minimum difference in length of the plurality of bristles in the first group and length of the plurality of bristles in the second group is greater than half a diameter of one of the bristles of the plurality of bristles.

8. A brush seal as claimed in claim 1, wherein some of the second group of bristles contact the second component in use, the discontinuities being provided by angled end faces.

9. A brush seal for sealing between a first component and a second component which relatively rotate during normal use, comprising:
an annular housing which is attached to a first component in use;
a plurality of bristles arranged in multiple circumferential rows between an upstream side and a downstream side, each of the multiple circumferential rows extending around a circumference of the brush seal, each bristle of the plurality of bristles having a fixed end attached to the housing and a free end, wherein the free ends of at least some of the plurality of bristles contact the second component during normal use to provide a sealing surface,
wherein the sealing surface includes a plurality of discontinuities along at least one row of the multiple circumferential rows around the circumference of the brush seal for providing hydrodynamic lifting force in use,
wherein the at least one row of the plurality of bristles includes a first group which contact the second component in use, and a second group which are arranged to provide the discontinuity wherein the bristles of the first and second groups are randomly interspersed along the at least one row around an arcuate portion of the brush seal,
wherein the at least one row of the plurality of bristles is provided at either or both a most upstream side and a most downstream side of the plurality of bristles, and
wherein the bristles of the second group have a range of different lengths.

* * * * *